United States Patent [19]

Thompson

[11] 4,124,068
[45] Nov. 7, 1978

[54] HEAT EXCHANGE TUBE FOR FLUIDIZED BED REACTOR

[75] Inventor: Gregory J. Thompson, Waukegan, Ill.

[73] Assignee: UOP Inc., Des Plaines, Ill.

[21] Appl. No.: 797,087

[22] Filed: May 16, 1977

[51] Int. Cl.² ............................................. F28F 19/00
[52] U.S. Cl. ............................. 165/134 R; 122/367 C; 165/180
[58] Field of Search ................. 165/DIG. 8, 180, 179, 165/133, 134; 122/367 C, 367 R

[56] References Cited

U.S. PATENT DOCUMENTS

| 2,146,352 | 2/1939 | Rohrer | 165/133 |
| 3,304,919 | 2/1967 | Funk et al. | 122/367 C |
| 3,368,532 | 2/1968 | Lewis et al. | 165/134 |
| 3,413,316 | 12/1968 | Burne et al. | 165/180 |

FOREIGN PATENT DOCUMENTS 426,114  3/1935  United Kingdom .............. 165/DIG. 8

Primary Examiner—Charles J. Myhre
Assistant Examiner—Sheldon Richter
Attorney, Agent, or Firm—James R. Hoatson, Jr.; William H. Page, II; Barry L. Clark

[57] ABSTRACT

Liquid containing heat transfer tube for use in a fluidized bed reactor is protected against erosive effects of the fluidized medium by having radially outwardly extending fins on its outer surface and by having the entire outer surface area between the fins covered by a layer of an abrasion resistant refractory which is supported by a metallic substrate such as expanded metal.

6 Claims, 2 Drawing Figures

HEAT EXCHANGE TUBE FOR FLUIDIZED BED REACTOR

BACKGROUND OF THE INVENTION

Most heat transfer units are utilized in environments where erosion of the heat exchange tubes is of little consequence. This situation does not hold, however, in fluidized bed devices such as fluid catalytic crackers where high temperatures and the rapid movement of particles accelerate the erosion of the bed cooling tubes. Furthermore, the rupture of an eroded tube and release of water contained therein into a bed of hot catalyst at a temperature of 1200–1500° F. creates rapid expansion and extremely high relieving loads for the vessel. To prolong tube life, the walls may be made heavier. However, heavier tubes are not only more expensive but are not as efficient in heat transfer. Furthermore, once erosion starts to take place on one part of a tube it often tends to accelerate quickly. Thus, individual tubes would likely be replaced on a regular basis. Replacement, however, requires closing down production and is thus extremely expensive.

In some portions of fluidized bed units other than the cooling tubes it has been common practice to provide erosion protection by attaching ¾ inch thick hexagonal mesh in surrounding relation to the item, such as a valve, to be protected. The openings in the mesh are then filled with an abrasion resistant refractory. Such a covering would not be suitable for the conventional plain cooling tubes due to its large size and because it would interfere with heat transfer.

SUMMARY

It is among the objects of the present invention to provide a heat transfer tube which can be utilized in a hostile environment such as that of a fluid catalytic cracker or regenerator.

An additional object is to provide protection against erosion for the wall surface of a heat transfer tube.

These and other objects are attained by the heat transfer tube of the present invention. The tube is preferably type 310 or 316 stainless steel provided with a plurality of longitudinal, radially extending fines which are preferably extruded. The outer wall surface of the tube between adjacent fins has a substrate firmly applied to it such as expanded metal mesh anchored by a series of tack welds. An abrasion resistant refractory material, such as Resco AA-22, manufactured by Resco Products, Inc., is then gunned or otherwise applied to the substrate so as to be generally flush with the surface thereof. Where gunned on, it would preferably be squeegeed down flush with the mesh so that there would be no portions which could flake off following expansion and contraction cycles.

DESCRIPTION OF THE PREFERRED EMBODIMENT

Figure 1:
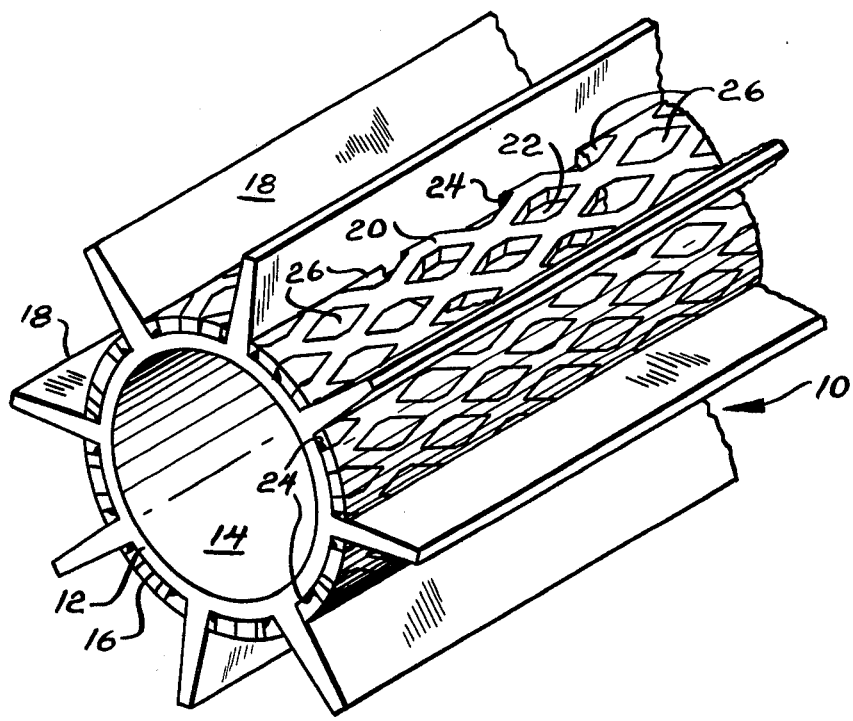
FIG. 1 shows a fragmentary, partially broken away, perspective view of a tube in accordance with the invention.
Figure 2:
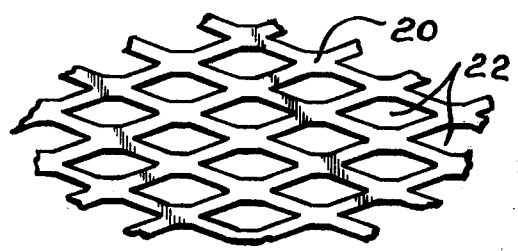
FIG. 2 shows a top view of a portion of a strip of expanded metal of the type applied to the outer tube surface in FIG. 1.

FIG. 1 illustrates a tube assembly indicated generally at 10 which embodies my invention. The tube assembly 10 includes a tube 12 having an inner wall 14 and an outer wall 16 which includes a plurality of integral fins 18 extending outwardly therefrom. Strips of expanded metal mesh 20, such as shown in more detail in FIG. 2, include a plurality of openings 22. The strips of mesh 20 are attached to the outer tube walls 16 in the space between adjacent fins 18 and are affixed to the tube wall such as by a series of tack welds 24. An abrasion resistant refractory coating is then applied to the mesh, such as with a gun, to fill all of the openings 20 and completely isolate the wall surfaces 16 from the ambient environment such as the powder-like particles of a catalyst bed in which the assembly is adapted to be located. The refractory 26 is preferably very resistant to abrasion. This abrasion resistance is necessary not only to protect the underlying tube but to avoid any possibility of the refractory contaminating the fluidized bed. Since the refractory will expand and contract at a different rate than the underlying tube, it is contained within the openings 22 which tend to encapsulate it and prevent its flaking off as would happen if a continuous coating were applied to the tube.

The mesh 20 is preferably of a thickness of approximately 0.125 inches although thicknesses in the range of about 0.1 through 0.3 inches would also be suitable. So that the fins 18 will have an effective area for heat transfer, their height should be such compared to the thickness of the mesh 20 that the height of the mesh is no more than about one-fourth the height of the fins 18.

Although it is recognized that the exposed fin portions 18 will be subject to erosion by the fluidized bed particles, the fins are provided of sufficient length and thickness that erosion will be insignificant as compared to the damage caused if the tube wall per se were to erode. For example, the tube 12 would preferably have a diameter of about 2.0 inches and the fins would be about 1.0 inches high. Both the tube 12 and the mesh 20 would be made of a material, such as a 300 series stainless steel, which would be capable of withstanding the environment of the catalyst bed in which they would be situated.

I claim as my invention:

1. A heat transfer tube assembly for use in an erosive environment comprising an elongated metal tube having a plurality of outwardly extending fin portions and a plurality of wall surface portions intermediate said fin portions, metal mesh means affixed to said wall surface portions defining a plurality of small open areas having a depth of at least about 0.100 inch, said open areas being filled with an abrasion resistant refractory material to a height no greater than about one fourth the height of said fin portions so that the major portion of the surface area of the fins is exposed for heat transfer while no portion of said wall surface portions is exposed to erosion.

2. The tube of claim 1 wherein said fin portions are integrally extruded with said tube.

3. The tube of claim 1 wherein said refractory material has a height of about 0.1–0.3 inches.

4. The tube of claim 1 wherein said refractory material has a height of about 0.125 inches.

5. The tube of claim 1 wherein said fins have a height of about 1.0 inches.

6. The tube of claim 5 wherein said tube has an internal diameter of about 2.0 inches.

* * * * *